US006794049B2

(12) United States Patent
Kuo et al.

(10) Patent No.: US 6,794,049 B2
(45) Date of Patent: Sep. 21, 2004

(54) FAST-DRY, HIGH SOLIDS COATING COMPOSITIONS BASED ON ACETOACETATE-FUNCTIONALIZED ALKYD RESINS

(75) Inventors: Thauming Kuo, Kingsport, TN (US); Paul Vincent Grosso, Algonquin, IL (US); Gary Eugene Spilman, Lake in th Hil, IL (US); Mark Dwight Clark, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 10/121,229

(22) Filed: Apr. 12, 2002

(65) Prior Publication Data

US 2003/0195304 A1 Oct. 16, 2003

(51) Int. Cl.⁷ .......................... C08L 67/08; B32B 27/26; B32B 27/36
(52) U.S. Cl. ...................... 428/480; 428/481; 524/601; 524/609; 525/447; 528/295.5
(58) Field of Search ...................... 525/447; 528/295.5; 524/601, 609; 428/480, 481

(56) References Cited

U.S. PATENT DOCUMENTS

| | | | | |
|---|---|---|---|---|
| 2,730,517 | A | * | 1/1956 | Vogel ...................... 528/295.5 |
| 3,196,119 | A | | 7/1965 | Boller et al. |
| 3,258,475 | A | * | 6/1966 | Faulkner ...................... 554/72 |
| 3,332,793 | A | | 7/1967 | Dreher |
| 3,438,795 | A | | 4/1969 | Schroeder et al. |
| 3,641,201 | A | | 2/1972 | Hellman |
| 3,734,874 | A | | 5/1973 | Kibler et al. |
| 4,113,702 | A | | 9/1978 | Psencik |
| 4,131,579 | A | | 12/1978 | Mummenthey et al. |
| 4,474,941 | A | | 10/1984 | Wilk et al. |
| 4,622,072 | A | | 11/1986 | Turner |
| 4,690,980 | A | | 9/1987 | Singer et al. |
| 4,719,254 | A | | 1/1988 | Levine |
| 4,973,656 | A | | 11/1990 | Blount |
| 5,051,529 | A | | 9/1991 | Witzeman et al. |
| 5,218,042 | A | | 6/1993 | Kuo et al. |
| 5,288,804 | A | * | 2/1994 | Kim ........................... 525/154 |
| 5,349,026 | A | | 9/1994 | Emmons et al. |
| 5,371,148 | A | | 12/1994 | Taylor et al. |
| 5,378,757 | A | | 1/1995 | Blount, Jr. et al. |
| 5,484,849 | A | | 1/1996 | Bors et al. |
| 5,498,659 | A | | 3/1996 | Esser |
| 5,530,059 | A | | 6/1996 | Blount, Jr. et al. |
| 6,187,385 | B1 | | 2/2001 | Atkins |
| 6,262,149 | B1 | | 7/2001 | Clark et al. |
| 6,344,503 | B1 | | 2/2002 | Nkansah et al. |

FOREIGN PATENT DOCUMENTS

| | | |
|---|---|---|
| EP | 0 227 454 A2 | 7/1987 |
| EP | 0 351 024 A2 | 1/1990 |
| EP | 0 549 865 A1 | 7/1993 |
| EP | 0 570 213 A2 | 11/1993 |
| EP | 0 849 341 A2 | 6/1998 |
| EP | 1002842 A1 | 5/2000 |
| EP | 1 057 857 A2 | 12/2000 |
| GB | 791 325 A | 2/1958 |
| GB | 2 045 266 A | 10/1980 |
| JP | 48085628 | 11/1973 |
| WO | WO 95/03350 A1 | 2/1995 |
| WO | WO 96/41833 A1 | 12/1996 |
| WO | WO 99/31162 A1 | 6/1999 |
| WO | WO 01/00741 A1 | 1/2001 |
| WO | WO 02/33008 A1 | 4/2002 |

OTHER PUBLICATIONS

U.S. patent application Ser. No. 10/121,754, Kuo et al., filed Apr. 12, 2002.
F. Del Rector et al., Journal of Coatings Technology, pp. 31–37, vol. 61, No. 771, Apr. 1989.
Oldring et al, Resins for Surface Coatings, 1987, vol. 1, p. 127.
Oldring et al, Resins for Surface Coatings, 1987, vol. 1, p. 181.
Calbo, Handbook of Coatings Additives, 1987, pp. 496–506.
Witzeman, et al, Journal of Coatings Technology, 1990, vol. 62, No. 789, pp. 101–112.

* cited by examiner

Primary Examiner—Patricia A. Short
(74) Attorney, Agent, or Firm—Michael K. Carrier; Bernard J. Graves, Jr.

(57) ABSTRACT

Acetoacetate-functional alkyd resins are disclosed, as are compositions including such resins in combination with at least one drier and an organic solvent. The acetoacetate-functional alkyd resin described is the reaction product of an alkyd resin with an alkyl acetoacetate. Also disclosed are methods of preparing such compositions, and uses for such compositions.

14 Claims, No Drawings

FAST-DRY, HIGH SOLIDS COATING COMPOSITIONS BASED ON ACETOACETATE-FUNCTIONALIZED ALKYD RESINS

FIELD OF THE INVENTION

The invention relates to coating compositions, and more particularly, to coating compositions having acetoacetate-functionalized alkyd resins.

BACKGROUND OF THE INVENTION

In recent years, considerable efforts have been made by the coatings industry to develop coating formulations having little or no volatile organic compound (VOC) content. Regulations to limit the amount of VOC content of industrial coatings have encouraged research and development to explore new technologies directed at reducing solvent emissions from industrial solvent-based coatings operations such as those used for automotive parts, appliances, general metal products, furniture, and the like. However, while the move to reduced organic solvent-based compositions brings health and safety benefits, these lower VOC coating compositions must still meet or exceed the performance standards expected from solvent-based compositions.

Alkyd resins are one of the most common binders used for ambient-cure, solvent-based coatings. The resistance properties of traditional, solvent-borne alkyd resins are developed via autooxidative crosslinking of the alkyd film. Crosslinking occurs when the activated methylene groups in the unsaturated fatty acids or oils of the alkyd are oxidized in air to give hydroperoxides which subsequently decompose to generate free radicals, resulting in various types of oxidative crosslinking. This oxidative crosslinking process is commonly accelerated by adding driers such as, for example, various salts of cobalt, zirconium, calcium and manganese. However, while alkyd resins have shown, and continue to show, promise, they have relatively slow "dry" and/or cure times, particularly at ambient temperatures. Various modifications have been made to alkyd resins to address such concerns.

One such attempt includes polymerization of an alkyd resin with a vinyl compound, such as styrene or methyl methacrylate, via a free-radical reaction, to produce a vinyl-alkyd copolymer or a vinyl alkyd. Vinyl alkyd resins generally have a higher molecular weight and a higher $T_g$, producing coatings with reduced tack-free time (solvent evaporation). However, the through-dry time (oxidation of the film) of such coatings is longer, due to the decreased degree of unsaturation in the alkyd as a result of copolymerization with the vinyl compound. This problem is described in further detail in *Resins for Surface Coatings*, Vol.1, p.181, ed. by P. K. T. Oldring and G. Hayward, SITA Technology, London, UK, 1987, which is incorporated herein by reference. An additional drawback is that paint formulations containing vinyl alkyd resins require greater amounts of solvent, due to the increased molecular weight and $T_g$ of the vinyl alkyd.

Various methods for the preparation of acetoacetylated coating resins have been described by J. S. Witzeman et al. in the Journal of Coatings Technology, Vol. 62, No.789, pp. 101–112 (1990). This article discloses acetoacetylation of polyester resins, and their application for baking enamels with a melamine crosslinker.

U.S. Pat. No. 5,484,849 discloses vinyl polymer compositions containing pendant acetoacetate functionality which is curable in air in the presence of a source of free radicals. The vinyl polymers are prepared by free radical polymerization (i.e., emulsion polymerization) of an acetoacetate-functional monomer (e.g., acetoacetoxyethyl methacrylate) and other acrylic monomers. The patent also discloses that an autooxidizable compound is required, to provide a source of free radicals to cure and crosslink the acetoacetate functionality. As a result of this, a portion of the acetoacetate groups could be consumed during the free radical polymerization due to the reaction between acetoacetate functionality and free radicals. This could, in turn, lead to insufficient curing upon film formation. It is therefore desirable to invent an air-dry coating system based on acetoacetyl functional polymers prepared via a non-free radical reaction.

Thus, there still exists a need in the art for a modified or functionalized alkyd resin capable of undergoing crosslinking upon film formation, which can be used to prepare ambient oxidative cure, fast-dry, and high solids coatings having a low VOC content. Ideally, such coatings would exhibit the properties and advantages of high VOC coatings.

SUMMARY OF THE INVENTION

The invention provides an acetoacetate-functionalized alkyd composition comprising an acetoacetate-functionalized alkyd resin, at least one drier, and an organic solvent. The acetoacetate-functionalized alkyd resin comprises the reaction product of (a) an alkyd resin, and (b) an alkyl acetoacetate.

The invention also relates to a method of preparing an acetoacetate-functionalized alkyd composition comprising the step of contacting an acetoacetate-functionalized alkyd resin with at least one drier in the presence of an organic solvent.

DETAILED DESCRIPTION OF THE INVENTION

The invention provides an acetoacetate-functionalized alkyd composition comprising an acetoacetate-functionalized alkyd resin, at least one drier, and an organic solvent. The acetoacetate-functionalized resin comprises the reaction product of (a) an alkyd resin, and (b) an alkyl acetoacetate, as shown in FIG. (1).

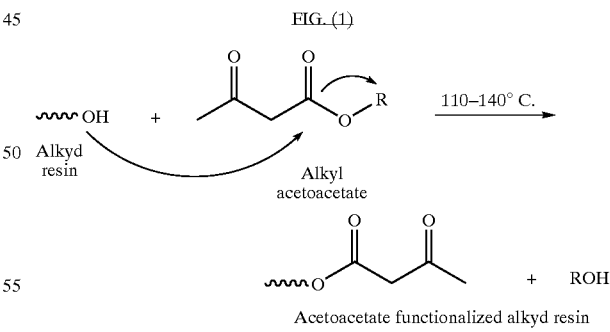

Any of a number of alkyl acetoacetates may be effectively used as acetoacetylating agents in the transesterification reaction to generate the acetoacetate-functionalized alkyd resin. Typically, the reaction is driven by the removal of the alcohol by-product as it is formed. Although halides are traditionally utilized as leaving groups, the various acetoacetate esters are easier to handle and to store.

In a preferred embodiment of the invention, an acetoacetate-functionalized alkyd composition contains from about 50 to about 90 wt %, based on the total weight of the composition, of an acetoacetate-functionalized alkyd resin, from about 10 to about 50 wt %, based on the total weight of the composition, of an organic solvent, and from about 0.01–1.0 wt %, based on the total weight of the composition, of at least one drier.

Such an acetoacetate-functionalized alkyd resin exhibits superior through-dry time properties. Furthermore, an acetoacetate-functionalized alkyd resin of this invention exhibits superior tack-free time properties which previously could only be improved by increasing the molecular weight and $T_g$ of the alkyd resin. Since the amount of VOC generally added to alkyd resin compositions and/or formulations is directly related to the molecular weight and $T_g$ of the alkyd resin, compositions or formulations containing an acetoacetate-functionalized alkyd resin of the invention would require less VOC content.

In a preferred embodiment of the invention, the acetoacetate-functionalized alkyd resin comprises the reaction product of: (a) from about 70 to about 97 wt % of an alkyd resin, and (b) from about 3 to about 30 wt % of an alkyl acetoacetate, each as described herein, wherein the weight percents are based on the total weight of (a) and (b).

Any alkyd resin may be used as an alkyd resin in a coating composition of the invention. An alkyd may typically be prepared by reacting a diol, a polyol, a polyacid, a monofunctional acid, and a fatty acid, fatty ester or naturally occurring-partially saponified oil, optionally in the presence of a catalyst. Preferably, an alkyd resin is the reaction product of (i) from 0 to about 30 mol % of a diol, (ii) from about 10 to about 40 mol % of a polyol, (iii) from about 20 to about 40 mol % of a polyacid, (iv) from 0 to about 10 mol % of a monofunctional acid, (v) from about 10 to about 50 mol % of a fatty acid, fatty ester or naturally occurring oil and, optionally, (vi) a catalyst, wherein the mole percents are based on the total moles of (i), (ii), (iii), (iv), (v) and (vi) if present. Suitable examples of each of the components of the alkyd resin include those known in the art including, but not limited to, those discussed below, and in *Resins for Surface Coatings*, Vol.1, p. 127, ed. by P. K. T. Oldring and G. Hayward, SITA Technology, London, UK, 1987, incorporated herein by reference.

The fatty acid, fatty ester, or naturally occurring, partially-saponified oil may be any fatty acid, fatty ester, or naturally occurring, partially-saponified oil known in the art used in the formation of an alkyd resin. In a preferred embodiment, at least one monobasic fatty acid, fatty ester, or naturally occurring, partially-saponified oil is used and selected from the following formulae (I), (II) and (III):

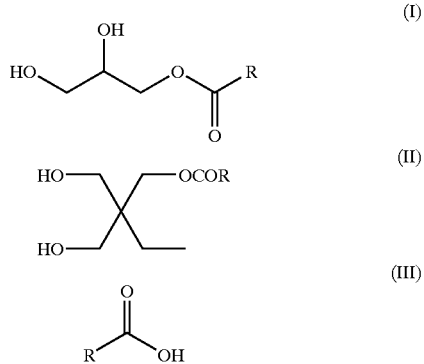

In formulae (I), (II) and (III), R is a saturated or unsaturated $C_8$–$C_{20}$ alkyl group. More particularly, R is one of the following unsaturated $C_{17}$ alkyl groups:

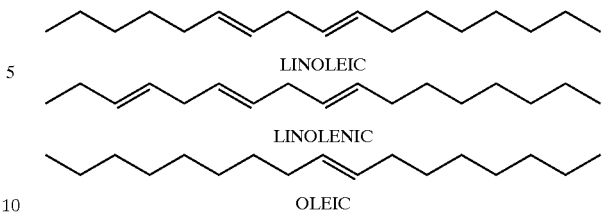

In another embodiment, the monobasic fatty acid or fatty ester oil may be prepared by reacting an oil or a fatty acid with a polyol. Examples of suitable oils include sunflower oil, canola oil, dehydrated castor oil, coconut oil, corn oil, cottonseed oil, fish oil, linseed oil, oiticica oil, soya oil, tung oil, animal grease, castor oil, lard, palm kernel oil, peanut oil, perilla oil, safflower oil, tallow oil, walnut oil, and the like. Suitable examples of fatty acids, alone or as components of oil, include, but are not limited to, tallow acid, soya acid, myristic acid, linseed acid, crotonic acid, versatic acid, coconut acid, tall oil fatty acid (e.g., PAMOLYN 200, commercially available from Eastman Chemical Co.), rosin acid, neodecanoic acid, neopentanoic acid, isostearic acid, 12-hydroxystearic acid, cottonseed acid, and the like.

The polyol used in the preparation of the alkyd resin itself, or the monobasic fatty acid or fatty ester, is preferably selected from aliphatic, alicyclic, and aryl alkyl polyols. Suitable examples of polyols include, but are not limited to, trimethylolpropane (TMP), pentaerythritol (PE), trimethylolethane, erythritol, threitol, dipentaerythritol, sorbitol, glycerine, and the like. Preferably, the polyol is trimethylolpropane (TMP) or pentaerythntol (PE).

In addition to the polyol, a diol may be used in the preparation of the alkyd resin. Examples of suitable diols include, but are not limited to, neopentyl glycol (NPG), ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane, -1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2cyclohexanedimethanol, 1,3-cyclohexanedimethanol, 1,4cyclohexanedimethanol, 2,2,4-trimethyl 1,3-pentanediol, 2,2,4-tetramethyl-1,3-cyclobutanediol, p-xylenediol, hydroxypivalyl hydroxypivalate, 1,10-decanediol, and hydrogenated bisphenol A. Preferably, the diol is neopentyl glycol (NPG).

The polyacid (dicarboxylic acid or tricarboxylic acid) and monofunctional acid (monocarboxylic acid) components of the alkyd resin may be any polyacid or monofunctional acid known in the art used in the formation of an alkyd resin. The dicarboxylic acid may be, for example, isophthalic acid, phthalic anhydride(acid), terephthalic acid, adipic acid, tetrachlorophthalic anhydride, dodecanedioic acid, sebacic acid, azelaic acid, 1,4-cyclohexanedicarboxylic acid, 1,3cyclohexanedicarboxylic acid, hexahydrophthalic anhydride, tetrahydrophthalic anhydride, maleic anhydride, fumaric acid, succinic anhydride, succinic acid, 2,6naphthalenedicarboxylic acid, glutaric acid, and the like. Preferably, the dicarboxylic acid is isophthalic acid, phthalic anhydride, or phthalic acid. The tricarboxylic acid may be, for example, trimellitic anhydride. A monofunctional acid may also be used, such as, for example, benzoic acid, acetic acid, propionic acid, tbutylbenzoic acid, and butanoic acid.

Optionally, a catalyst may be used to promote the formation of an alkyd resin. The catalyst may be any catalyst known in the art used in the formation of an alkyd resin. Preferably, the catalyst is an acid catalyst, such as, for example, FASCAT 4100. The amount of catalyst added promotes the formation of an alkyd resin, as described above, and may be determined by routine experimentation as understood by those skilled in the art. Preferably, a catalyst is added in amounts ranging from about 0.01–1.00 wt % based on the amount of reactants.

An alkyd resin may be prepared at a temperature range of from about 170–250° C. In a preferred embodiment of the invention, an alkyd resin has a hydroxyl number of from about 30 to about 180 mg KOH/g, an acid number of from 0 to about 50 mg KOH/g, and a number average molecular weight of from about 700 to about 5000.

In a preferred embodiment of the invention, an acetoacetate-functionalized alkyd resin is prepared by reacting (a) from about 85 to about 95 wt % of an alkyd resin, and (b) from about 5 to about 15 wt % of t-butyl acetoacetate, at about 100–140° C., until the desired amount of the condensate, t-butanol, is obtained, wherein the weight percents are based on the total weight of (a) and (b).

The invention also provides a method of preparing an acetoacetate-functionalized alkyd composition comprising the step of combining an acetoacetate-functionalized alkyd resin with at least one drier, in the presence of an organic solvent, each as described above. The acetoacetate-functionalized alkyd resin may be prepared as described above. Preferably, the acetoacetate-functionalized alkyd resin is reacted with at least one drier, present in an amount of from about 0.01–1.0 wt %, in an organic solvent.

Suitable alkyl acetoacetates used for the preparation of acetoacetate-functionalized alkyd resins include t-butyl acetoacetate, ethyl acetoacetate, methyl acetoacetate, isobutyl acetoacetate, isopropyl acetoacetate, n-propyl acetoacetate, and n-butyl acetoacetate. t-Butyl acetoacetate is preferred.

The drier of an ambient cure composition of the invention may be any drier known in the art. Examples of suitable driers include, but are not limited to, various salts of cobalt, zirconium, calcium, zinc, lead, iron, cerium, aluminium, and manganese. Preferably, the drier is a cobalt drier. Mixtures of driers (i.e. a drier system) may also be used. The driers typically are used as octoates or naphthenates, in an amount of from 0.005–0.5 wt. % metal, based on the alkyd resin. Examples of commercial products are Zirconium HEX-CEM, Cobalt TEN-CEM, Calcium CEM-ALL, Zirconium HYDR-OCEM, and Cobalt HYDRO-CURE II sold by OMG Americas of Westlake, Ohio. A description of metal driers, their functions, and methods for using them may be found in *Handbook of Coatings Additives*, p.496–506, ed. by L. J. Calbo, Marcel Dekker, INC. New York, N.Y., 1987, which is incorporated by reference herein in its entirety.

In a preferred embodiment of the invention, an acetoacetate-functionalized alkyd coating composition, as described above, may also contain at least one pigment, to form an acetoacetate-functionalized alkyd coating enamel composition. Preferably, the pigment is present in an amount of from about 30 to about 60 wt %, based on the total weight of the composition. Examples of suitable pigments include those recognized by those of ordinary skill in the art of surface coatings. For example, the pigment may be a typical organic or inorganic pigment, especially those set forth by the Colour Index, 3d Ed., 2d Rev., 1982, published by the Society of Dyers and Colourists in association with the American Association of Textile Chemists and Colorists, incorporated herein by reference. Other examples of suitable pigments include, but are not limited to, titanium dioxide, barytes, clay, calcium carbonate, CI Pigment White 6 (titanium dioxide), CI Pigment Red 101 (red iron oxide), CI Pigment Yellow 42, CI Pigment Blue 15,15:1,15:2,15:3,15:4 (copper phthalocyanines); CI Pigment Red 49:1 and CI Pigment Red 57:1. Preferably, the pigment is titanium oxide. Colorants such as, for example, phthalocyanine blue, molybdate orange, or carbon black may also be added to the ambient cure oxidative cure enamel composition.

An acetoacetate-functionalized alkyd composition, preferably an ambient oxidative cure enamel composition, may be coated onto a substrate, and cured using techniques known in the art (e.g., by spray-applying 3 to 4 mils of wet coating onto a metal panel, and heating in a 150° C. forced air oven for 30 minutes). The substrate may be any common substrate, such as paper, polyester films such as polyethylene or polypropylene, metals such as aluminum or steel, glass, urethane elastomers, primed (painted) substrates, and the like. An acetoacetate-functionalized alkyd composition of the invention may be cured at room temperature (ambient cure).

An acetoacetate-functionalized alkyd composition of the invention may further contain one or more coating additives known in the art. Examples of suitable coating additives include, but are not limited to, leveling and flow control agents such as silicones, fluorocarbons or cellulosics; extenders; plasticizers; flatting agents; pigment wetting and dispersing agents; ultraviolet (UV) absorbers; UV light stabilizers; defoaming and antifoaming agents; anti-settling, anti-sag and bodying agents; anti-skinning agents; anti-flooding and anti-floating agents; and corrosion inhibitors. Specific examples of such additives can be found in Raw Materials Index, published by the National Paint & Coatings Association, 1500 Rhode Island Avenue, N.W., Washington, D.C. 20005, incorporated by reference herein. Further examples of such additives may be found in U.S. Pat. No. 5,371,148, which is likewise incorporated herein by reference.

Examples of flatting agents include, but are not limited to, synthetic silica, available from the Davison Chemical Division of W. R. Grace & Company as SYLOID ®; polypropylene, available from Hercules Inc., as HERCOFLAT ®; and synthetic silicate, available from J. M. Huber Corporation, as ZEOLEX ®.

Examples of dispersing agents include, but are not limited to, sodium bis(tridecyl) sulfosuccinate, di(2-ethyl hexyl) sodium sulfosuccinate, sodium dihexylsulfosuccinate, sodium dicyclohexyl sulfosuccinate, diamyl sodium sulfosuccinate, sodium dusobutyl sulfosuccinate, disodium iso-decyl sulfosuccinate, disodium ethoxylated alcohol half ester of sulfosuccinic acid disodium alkyl amido polyethoxy sulfosuccinate, tetra-sodium N-(1,2-dicarboxyethyl)-N-octadecyl sulfosuccinamate, disodium N-octasulfosuccinamate, sulfated ethoxylated nonylphenol, 2-amino-2-methyl-1-propanol, and the like.

Examples of viscosity, suspension, and flow control agents include, but are not limited to, polyaminoamide phosphate, high molecular weight carboxylic acid salts of polyamine amides, and alkylene amine salts of an unsaturated fatty acid, all available from BYK Chemie U.S.A. as ANTI TERRA®. Further examples include, but are not limited to, polysiloxane copolymers, polyacrylate solution, cellulose esters, hydroxyethyl cellulose, hydroxypropyl cellulose, polyamide wax, polyolefin wax, hydroxypropyl methyl cellulose, polyethylene oxide, and the like.

Several proprietary antifoaming agents are commercially available and include, but are not limited to, BUBREAK® of Buckman Laboratories Inc.; BYK® of BYK Chemie, U.S.A.; FOAMASTER® and NOPCO® of Henkel Corp./ Coating Chemicals; DREWPLUS® of the Drew Industrial Division of Ashland Chemical Company; TRYSOL® and TROYKYD® of Troy Chemical Corporation; and SAG® of Union Carbide Corporation.

Examples of U.V. absorbers and U.V. light stabilizers include, but are not limited to, substituted benzophenone, substituted benzotriazoles, hindered amines, and hindered benzoates, available from American Cyanamid Company as CYASORB UV®; and diethyl-3acetyl-4-hydroxy-benzyl-phosphonate, 4-dodecyloxy-2-hydroxy benzophenone, and resorcinol monobenzoate.

Examples of solvents are well known, and include, but are not limited to, benzene, xylene, mineral spirits, vm&p naptha, toluene, acetone, methyl ethyl ketone, methyl n-amyl ketone, methyl isoamyl ketone, n-butyl acetate, isobutyl acetate, t-butyl acetate, n-propyl acetate, isopropyl acetate, ethyl acetate, methyl acetate, ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol mono-isobutyrate, ethylene glycol mono-octyl ether, diacetone alcohol, TEXANOL® ester alcohol (Eastman Chemical Co.), and the like. Such solvents may also include reactive solvents, such as, for example, diallyl phthalate, SANTOLINK XI100® polyglycidyl allyl ether from Monsanto, and others as described in U.S. Pat. Nos. 5,349,026 and 5,371,148, incorporated herein by reference. Preferably, the organic solvent is xylene. An acetoacetate-functionalized alkyd composition of the invention has a high solids content of generally greater than about 70%.

The following examples are given to illustrate the invention. It should be understood, however, that the invention is not to be limited to the specific conditions or details described in these examples.

The examples of various coating compositions of the invention use the following materials not described above:

PAMOLYN 200, a tall oil fatty acid, sold by Eastman Chemical Co. of Kingsport, Tenn.

FASCAT 4100 and FASCAT 4350, esterification catalysts, sold by M&T Chemicals of Rahway, N.J.

Zirconium HEX-CEM, a zirconium carboxylate, sold by OMG Americas of Westlake, Ohio.

Cobalt TEN-CEM, a cobalt carboxylate, sold by OMG Americas of Westlake, Ohio.

Silwet L-77, a polyalkyleneoxide modified heptamethyltrisiloxane, sold by OSI Specialities of Danbury, Conn.

The following methods were used to evaluate the coatings and films prepared according to the invention.

Tack-Free Cotton Test: The coating is considered tack free if it does not pull fibers when the film surface is in contact with absorbent cotton fibers.

Through-Dry Thumb Test: The coating is considered through dry if it is not affected (no wrinkling) by pressing and twisting with the thumb on the surface of the film.

EXAMPLES

Example 1

Preparation of Alkyd Resin 1

To a three-neck, round-bottom flask equipped with a mechanical stirrer, a steam-jacketed partial condenser, a Dean-Stark trap, a nitrogen inlet, and a water condenser, were charged pentaerythritol (PE) (425 g), trimethyloipropane (TMP) (174 g), soybean oil (2351 g), and FASCAT 4350 (0.39 g). The mixture was allowed to react at 238° C. for five hours in this alcoholysis step. To the mixture were then added isophthalic acid (IPA) (950 g) and the refluxing solvent, methyl isobutyl ketone (MIBK) (97.5 g). The reaction was allowed to continue at 238° C. until 203 mL of the condensate (water) was obtained. The acid number was determined to be 8.6 mg KOH/g. The resulting resin was allowed to cool and was isolated. The resin had a number average molecular weight (Mn) of 2,500, and a weight average molecular weight (Mw) of 200,000.

Example 2

Preparation of Acetoacetate-Functionalized Alkyd Resin 1

To a three-neck, round-bottom flask equipped with a mechanical stirrer, a steam-jacketed partial condenser, a Dean-Stark trap, a water condenser, and a nitrogen inlet, were charged the alkyd resin of Example 1 (202 g) and t-butyl acetoacetate (t-BAA) (17.1 g, 0.108 mol). The reaction mixture was stirred at 100° C. for 30 mm, and then at 110° C. for 1.5 hrs, while the distillate was collected in the Dean-Stark trap. The reaction was allowed to continue at 120° C. for 30 mm, at 130° C. for 30 mm, and at 140° C. for 2 hrs, during which a total of 12.5 mL of distillate was collected. The mixture was then allowed to cool and the resulting resin collected.

Example 3

Preparation of Acetoacetate-Functionalized Alkyd Resin 2

To a three-neck, round-bottom flask equipped with a mechanical stirrer, a steam-jacketed partial condenser, a Dean-Stark trap, a water condenser, and a nitrogen inlet, were charged the alkyd resin of Example 1 (203 g) and t-butyl acetoacetate (tBAA) (25.5 g, 0.161 mol). The reaction mixture was stirred at 100° C. for 30 mm, and then at 110° C. for 1 hr, while the distillate was collected in the Dean-Stark trap. The reaction was allowed to continue at 120° C. for 30 mm, at 130° C. for 30 min, and at 140° C. for 1.5 hrs, during which a total of 16.0 mL of distillate was collected. The mixture was then allowed to cool and the resulting resin collected.

Example 4

Coating Formulations

Coating formulations were prepared by mixing, respectively, the acetoacetate-modified alkyd resins (10.0 g) prepared from Examples 2 and 3 with xylene (4.29 g) and a drier blend (0.34 g). A control formulation was also prepared using the unmodified resin from Example 1. The drier blend was prepared by mixing Zirconium HEX-CEM (18%, OMG Americas) (42.1 g), Cobalt TEN-CEM (12%, OMG Americas) (12.6 g), and methyl amyl ketone (MAK) (29.8 g).

Example 5

Film Dry Time

The above coating formulations (70% solids) were drawn down on Leneta chart (3 mil wet thickness) and allowed to dry in air at room temperature. The results for the Tack-Free Cotton test and the Through-Dry Thumb test are listed in the table below:

|                     | Tack-Free Time (hr) | Through-Dry Time (hr) |
|---------------------|---------------------|-----------------------|
| Unmodified Alkyd 1  | >11 and <20         | >11 and <20           |
| Acetoacetate Alkyd 1| 9                   | 11                    |
| Acetoacetate Alkyd 2| 7                   | 9                     |

As shown in the table above, the dry times of the alkyds were significantly improved by modifying with t-BAA, and the higher the t-BAA ratio, the shorter the dry time.

Example 6

Preparation of Alkyd Resin 2

To a three-neck, round-bottom flask equipped with a mechanical stirrer, a steam-jacketed partial condenser, a DeanStark trap, a nitrogen inlet, and a water condenser, were charged pentaerythritol (PE) (78.2 g, 0.57 mol), trimethylolpropane (TMP) (65.4 g, 0.49 mol), isophthalic acid (IPA) (122 g, 0.73 mol), PAMOLYN 200 (Eastman) (367 g, 1.27 mol), and FASCAT 4100 (0.60 g). The mixture was allowed to react at 160–220° C. until 46.2 g of the condensate (water) was obtained. The acid number was determined to be 4.5 mg KOH/g. The resulting resin was allowed to cool and was isolated as 100% solids, with a number average molecular weight (Mn) of 2100, and a weight average molecular weight (Mw) of 13,200.

Example 7

Preparation of Acetoacetate-Functionalized Alkyd Resin 3

To a three-neck, round-bottom flask equipped with a mechanical stirrer, a steam-jacketed partial condenser, a Dean-Stark trap, a water condenser, and a nitrogen inlet were charged the hydroxyl functional alkyd resin of Example 6 (200 g) and t-butyl acetoacetate (t-BAA) (28.0 g, 0.18 mol). The reaction mixture was stirred at 100° C. for 30 min, and then at 110° C. for 1.5 hrs, while the distillate was collected in the Dean-Stark trap. The reaction was allowed to continue at 120° C. for 30 min, at 130° C. for 30 min, and at 140° C. for one hour, during which a total of 14.1 mL of the distillate was collected. The mixture was then allowed to cool. The resulting resin collected had a number average molecular weight (Mn) of 2100, and a weight average molecular weight (Mw) of 9000.

Example 8

Coating Formulations

Coating formulations were prepared by mixing, respectively, the alkyd resins (20.0 g) prepared from Examples 6 and 7 with mineral spirits (5.0 g) and a drier blend (0.68 g). The drier blend was prepared by mixing Zirconium HEX-CEM (18%, OMG Americas) (42.1 g), Cobalt TEN-CEM (12%, OMG Americas) (12.6 g), and methyl amyl ketone (MAK) (29.8 g).

Example 9

Film Dry Time

The above coating formulations (80% solids) were drawn down on Leneta chart (3 mil wet thickness) and allowed to dry in air at room temperature. The results for the Tack-Free Cotton test and the Through-Dry Thumb test are listed in the table below:

|                     | Tack-Free Time (hr) | Through-Dry Time (hr) |
|---------------------|---------------------|-----------------------|
| Unmodified Alkyd 2  | 22–25 hrs           | 3 days                |
| Acetoacetate Alkyd 3| 6–10 hrs            | 28 hrs                |

It should be understood that the foregoing discussion and examples merely present a detailed description of certain preferred embodiments. It will be apparent to those of ordinary skill in the art that various modifications and equivalents can be made without departing from the spirit and scope of the invention. All the patents, journal articles and other documents discussed or cited above are herein incorporated by reference.

We claim:

1. An acetoacetate-functional alkyd composition comprising:
   (I) an acetoacetate-functional alkyd resin, which comprises the reaction product of:
      (a) from about 70 to about 97 wt % of an alkyd resin; and
      (b) from about 3 to about 30 wt % of an alkyl acetoacetate, wherein the weight percents are based on the total weight of (a) and (b);
   (II) at least one drier; and
   (III) an organic solvent.

2. The acetoacetate-functional alkyd composition of claim 1, wherein:
   the acetoacetate-functional alkyd resin is present in an amount of from about 50 to about 90 wt %, based on the total weight of the composition;
   the drier is present in an amount of from about 0.01 to about 1.0 wt %, based on the total weight of the composition; and
   the organic solvent is present in an amount of from about 10 to about 50 wt %, based on the total weight of the composition.

3. The acetoacetate-functional alkyd composition of claim 1, wherein the alkyd resin comprises the reaction product of:
   (i) a diol, in an amount of from 0 to about 30 mole %;
   (ii) a polyol, present in an amount of from about 10 to about 40 mole %;
   (iii) a polyacid, present in an amount of from about 20 to about 40 mole %;
   (iv) a monofunctional acid, in an amount of from 0 to about 10 mole %; and
   (v) a fatty acid, a fatty ester, or a naturally occurring oil, present in an amount of from about 10 to about 50 mole %,
   wherein the mole percents are based on the total moles of (i), (ii), (iii), (iv) and (v).

4. The acetoacetate-functional alkyd composition of claim 3, wherein the diol comprises neopentyl glycol, the polyol comprises trimethylolpropane or pentaerythritol, the polyacid comprises isophthalic acid or phthalic anhydride, and the naturally occurring oil or fatty acid comprises soybean oil or tall oil fatty acid.

5. The acetoacetate-functional alkyd composition of claim 1, wherein the drier comprises at least one member selected from the group consisting of a cobalt salt, a zirconium salt, a calcium salt, a zinc salt, and a manganese salt.

6. The acetoacetate-functional alkyd composition of claim 1, wherein the alkyd resin has a hydroxyl number of from about 30 to about 180 mg KOH/g.

7. The acetoacetate-functional alkyd composition of claim 1, wherein the alkyl acetoacetate comprises t-butyl acetoacetate.

8. The acetoacetate-functional alkyd composition of claim 1, further comprising at least one additive selected from the group consisting of a flow control agent, an extender, a plasticizer, a flatting agent, a pigment wetting agent, a pigment dispersing agent, an ultraviolet (UV) absorber, a UV light stabilizer, a tinting pigment, a colorant, a defoaming agent, an antifoaming agent, an anti-settling agent, an anti-sag agent, a bodying agent, an anti-skinning agent, an anti-flooding agent, an anti-floating agent, and a corrosion inhibitor.

9. A method of making an acetoacetate-functional alkyd composition, comprising a step of combining (I) the acetoacetate-functional alkyd resin of claim 1;

(II) at least one drier; and (III) an organic solvent.

10. The method of claim 9, wherein:

the acetoacetate-functional alkyd resin is present in an amount of from about 50 to about 90 wt %;

the drier is present in an amount of from about 0.01 to about 1.0 wt %; and the organic solvent is present in an amount of from about 10 to about 50 wt%.

11. A substrate coated with the acetoacetate-functional alkyd composition of claim 1.

12. The acetoacetate-functional alkyd composition according to claim 1, wherein the at least one drier comprises one or more of: a cobalt salt, a zirconium salt, a calcium salt, a zinc salt, a lead salt, an iron salt, a cerium salt, an aluminum salt, or a manganese salt.

13. The acetoacetate-functional alkyd composition according to claim 1, wherein the at least one drier comprises a cobalt drier.

14. The acetoacetate-functional alkyd composition according to claim 1, wherein the at least one drier comprises one or more of: an octoate drier or a naphthenate drier.

* * * * *